United States Patent [19]

Blomquist et al.

[11] Patent Number: 4,641,981

[45] Date of Patent: Feb. 10, 1987

[54] DOT MATRIX PRINT HEAD

[76] Inventors: James E. Blomquist; Robert H. Wilczewski, both of 203 E. Main, Riverton, Wyo. 82501

[21] Appl. No.: 833,836

[22] Filed: Feb. 26, 1986

Related U.S. Application Data

[60] Division of Ser. No. 616,792, Jun. 1, 1984, which is a division of Ser. No. 499,208, May 31, 1983, abandoned, which is a division of Ser. No. 425,255, Sep. 28, 1982, Pat. No. 4,401,392, which is a continuation of Ser. No. 256,032, Apr. 21, 1981, abandoned, which is a division of Ser. No. 38,724, May 14, 1979, Pat. No. 4,279,518.

[51] Int. Cl.[4] .......................... B41J 3/12; B23P 19/04

[52] U.S. Cl. ................................ 400/124; 101/93.05; 29/433; 29/464

[58] Field of Search ..................... 400/124; 101/93.05; 29/464, 433, 241

[56] References Cited

U.S. PATENT DOCUMENTS 4,047,606 9/1977 Ott ...................................... 400/124
4,081,067 3/1978 Schrag ............................... 400/124
4,226,545 10/1980 Brandenburg ...................... 400/124

*Primary Examiner*—Paul T. Sewell
*Attorney, Agent, or Firm*—W. Scott Carson

[57] ABSTRACT

A modified wire guide and assembly method for facilitating the insertion of wires into a dot matrix print head. In the preferred embodiment, the wire guide has a planar surface with downwardly extending wire holes defined by first and second surfaces. The first surface has a truncated conical shape and the second surface has a cylindrical shape. Additionally, the wire guide has an upwardly extending, inclined cam surface that intersects the planar surface to form a closed path. The first surface defining each hole is positioned adjacent the cam surface and intersects the closed path so that a wire striking the cam surface will move down it toward and into one of the holes. The assembly method of the present invention involves inserting a wire through three wire guides using aids that apply a first force in a first direction to bow the wire and then apply a second force in an opposite direction to guide the wire through the print head.

3 Claims, 20 Drawing Figures

DOT MATRIX PRINT HEAD

This is a divisional application under 37 CFR 1.60, of pending prior application Ser. No. 616,792 filed on June 1, 1984 which is a division of U.S. patent application Ser. No. 499,208 filed May 31, 1983, now abandoned, which is a division of U.S. patent application Ser. No. 425,255 filed Sept. 28, 1982, now U.S. Pat. No. 4,401,392, which is a continuation of U.S. patent application Ser. No. 256,032 filed Apr. 21, 1981, now abandoned, which is a division of U.S. patent application Ser. No. 38,724 filed May 14, 1979, now U.S. Pat. No. 4,279,518, for a dot matrix print head.

FIELD OF THE INVENTION

This invention relates to the field of dot matrix printing and more particularly to the field of dot matrix print heads for printing alpha-numeric characters and symbols.

BACKGROUND OF THE INVENTION AND PRIOR ART

Much of the current activity in the dot matrix print head industry is being directed to improving the printing speed (characters per second, lines per minute) of the head to meet the needs of large company users. Such increased printing speed is usually accomplished with little thought being given to and at the expense of ease of manufacture, cost, reliability, ease of repair, degree of training needed to perform repairs, ruggedness, long life, and cost-performance ratios. Often, these current print head designs require the use of expensive and sophisticated materials and technology such as tungsten print wires, synthetic ruby bearings, and powdered metal technology with its expensive and scarce blends.

In direct contrast to the high speed printing needs of large company users are the needs of the rapidly developing personal computer market and small business computer market. In the personal and small business computer markets, the printing speed of the head is of relatively minor and secondary importance in comparison to cost, reliability, ruggedness, long life, ease of repair, and the degree of training necessary to perform repairs. It was with these needs of the personal and small business computer markets in mind that the present invention was developed. In contrast to the expensive and somewhat exotic manufacturing technique used in making most of the current print heads (e.g., powdered metal technology, tungsten print wires), the present invention uses simpler stamping and screw machine technique, cheaper materials such as steel print wires, and greatly simplified manufacture and assembly procedures including the use of assembly aids for inserting the print wires into spaced-apart guide members, a grinding aid and method whereby all of the print wires can be more easily and quickly ground to the proper length, and unique coil assembly and mounting plate designs whereby the clappers or armatures are automatically aligned with the impact ends of the print wires during the assembly of the print head.

Illustrative of the state of the art in dot or wire matrix print heads are the following U.S. Pat. Nos.:

| | |
|---|---|
| 3,333,667 | Nordin |
| 3,467,232 | Paige |

-continued

| | |
|---|---|
| 3,828,908 | Schneider |
| 3,842,955 | Iwasaki |
| 3,854,564 | Flaceliere et al |
| 3,889,793 | Cattaneo |
| 3,896,918 | Schneider |
| 3,897,865 | Darwin et al |
| 3,929,214 | Hebert |
| 3,991,869 | Berrey |
| 3,994,381 | Hebert |
| 4,004,671 | Kondur, Jr. |
| 4,004,673 | Burzlaff et al |
| 4,009,772 | Glaser et al |
| 4,049,107 | Murat |
| 4,049,108 | Giessner |
| 4,051,941 | Hebert |
| 4,060,161 | Nelson et al |
| 4,079,824 | Ku |
| 4,081,067 | Schrag et al |
| 4,091,909 | Lee |
| 4,117,435 | Hishida et al |
| 4,135,830 | Hishida et al |
| 4,140,406 | Wolf et al |
| 4,141,661 | Geis et al |

None of these patents, however, discloses the unique features of the present invention nor do any of these prior patents meet the needs and requirements of the developing personal and small business computer markets as well as the present invention.

SUMMARY OF THE INVENTION

This invention involves new and novel methods and apparatus relating to the assembly and structure of a dot matrix print head. The invention includes a unique coil assembly design comprising a bobbin, coil, and clapper built as a single unit that can be removeably placed among fixed pole pieces and yoke members mounted about a wire guide assembly. In the coil assembly, the bobbin has a first portion with an open-ended, hollow shape dimensioned to slideably receive a pole piece. It also has second and third bobbin portions mounted to and extending outwardly in opposite directions from this first bobbin portion. The coil is mounted about the first bobbin portion and the clapper of the coil assembly is mounted between the second and third bobbin portion for movement relative to the bobbin. The clapper mounting means on the second and third bobbin portion positions the central axis of the clappers substantially perpendicular to the axis of symmetry of the first bobbin portion and also includes means for restraining the clapper from movement along the central axis relative to the bobbin. In a second embodiment, a unique return spring arrangement is provided between the second bobbin portion and one end of the clapper.

The invention also includes a novel arrangement for supporting the coil assemblies in the print head whereby the clapper of each coil assembly is automatically aligned with the impact end of one of the print wires during the assembly of the print head. This supporting arrangement includes a mounting plate with free standing yoke portions and a plurality of pole pieces affixed to the mounting plate. The mounting plate, integral yoke portions, and pole pieces are all affixedly positioned relative to the wire guide assembly holding the print wires. Each second bobbin portion of each coil assembly also has an alignment slot dimensioned to slideably receive a respective yoke portion so that each coil assembly can be slid into place by receiving a pole piece in the first bobbin portion and a yoke portion in the alignment slot of the second bobbin portion. In this manner, the clapper of the respective coil assembly is automatically aligned with the impact end of one of the print wires during the assembly of the print head. This arrangement greatly simplifies the assembly process of the print head and significantly reduces the time required to assemble the print head for operation.

Other novel structural features of the present invention include unique designs for a heat sink member, wire guide members, snap-in retaining means between the bobbin and pole pieces, and mounting structure by which the print head is attached to the main guide and rail guide bearings of the printing mechanism. The present invention also includes novel methods of assembling the components of the print head including the use of assembly aids for inserting the print wires into the wire guide members and a grinding technique whereby all of the print wires can be easily and quickly ground to the proper length.

OBJECTS OF THE INVENTION

It is an object of the present invention to provide a new and novel dot matrix print head that is simple in design, inexpensive to manufacture, easy to assemble and repair without extensive training, reliable, rugged, long lasting, and possessing of a high cost-performance ratio relative to the current standards of the industry.

Another object of the present invention is to provide a new and novel dot matrix print head that is especially suited to meet the needs and requirements of the developing personal and small business computer markets.

It is an object to provide a dot matrix print head with a new and novel single unit, coil assembly design comprising a bobbin, coil, and clapper which can be removeably placed as a unit among fixed pole pieces and yoke members in the print head.

Another object is to provide a new and novel design for automatically aligning the clappers of the coil assemblies with the impact ends of the print wires during assembly of the print head.

Another object is to provide a new and novel design for a print head including a mounting plate, heat sink member, and coil assemblies all of which can be slideably assembled together and retained in place by snap-in, mating recess-detent arrangements between each bobbin and pole piece.

Another object is to provide a new and novel means for mounting a dot matrix print head to the main guide and rail guide bearings of the printing mechanism.

It is an object of the present invention to provide a new and novel design for the wire guide members of a print head to enable the print wires to be more easily and quickly positioned between spaced-apart wire guide members.

Another object is to provide new and novel assembly aids and procedures which simplify and hasten the assembly of a dot matrix print head.

Another object is to provide a new and novel method for easily and quickly grinding the print wires in a dot matrix print head to the proper length.

Additional objects as well as features and advantages of this invention will become evident from the descriptions set forth hereinafter when considered in conjunction with the accompanying drawings.

DETAILED DESCRIPTION OF THE PREFERRED EMBODIMENTS

Figure 1:
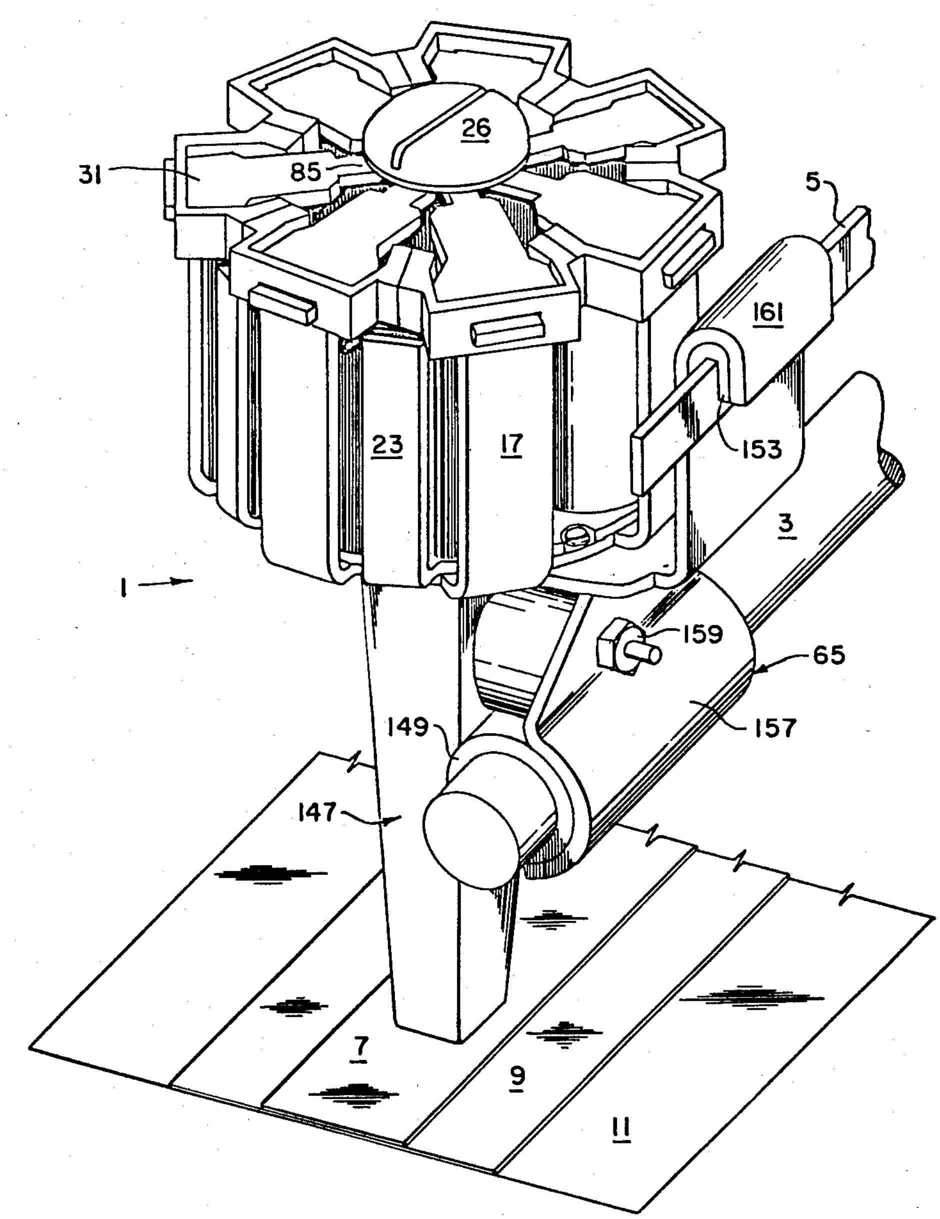
FIG. 1 is a perspective view of the print head of the present invention shown in use in one contemplated environment. For the sake of clarity, upstanding guide members 43 on the second portions of the bobbin members near the retaining screw 26 are not shown in this view.
Figure 2:
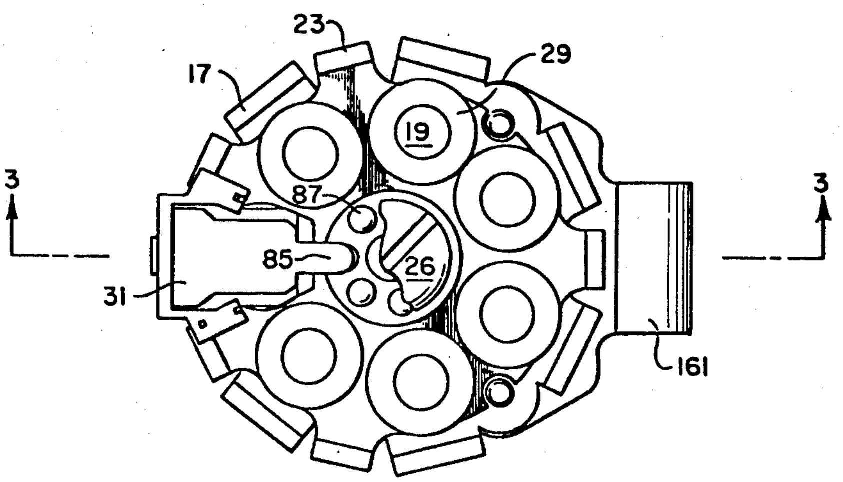
FIG. 2 is a top view of the print head of the present invention with some parts broken away and others not shown for the sake of clarity.

FIG. 1 is a perspective view of the print head 1 of the present invention shown in use in one contemplated environment. In this view, the print head 1 is mounted for movement along head shaft 3 and rear guide rail 5 relative to the ribbon 7, paper 9, and platen 11. As best seen in FIGS. 1-4, the print head 1 of the present invention includes wire guide assembly 13, mounting plate 15 with upstanding yoke portion 17, pole pieces 19 fixedly secured to the mounting plate 15, heat sink member 21 with upstanding fingers 23, coil assemblies 25, and retaining screw 26 with resilient backstop 28.

Figure 3:
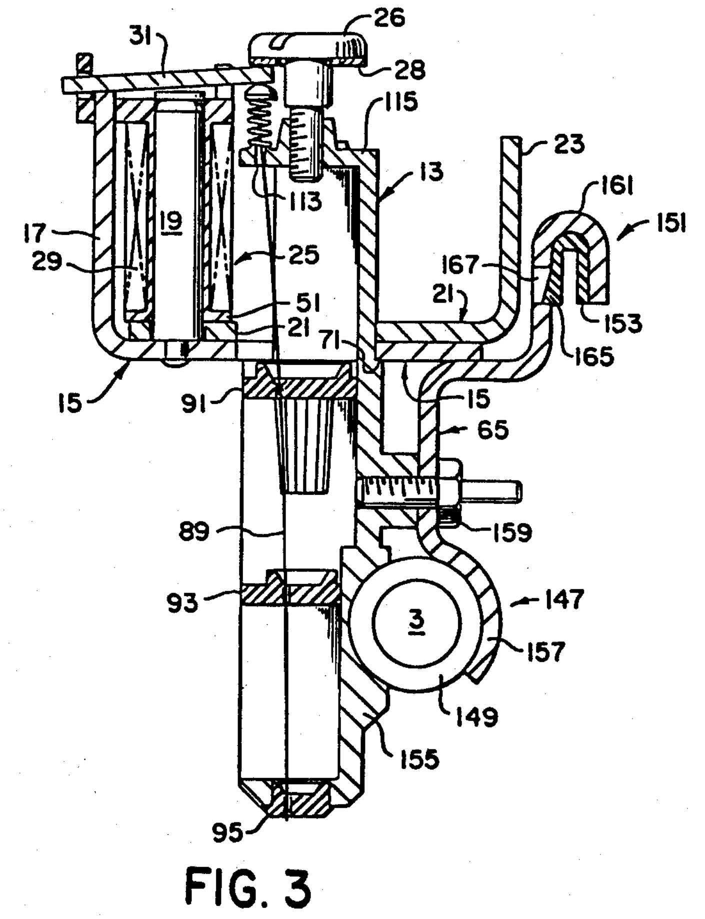
FIG. 3 is a cross-sectional view of the print head taken along line 3—3 of FIG. 2.
Figure 4:
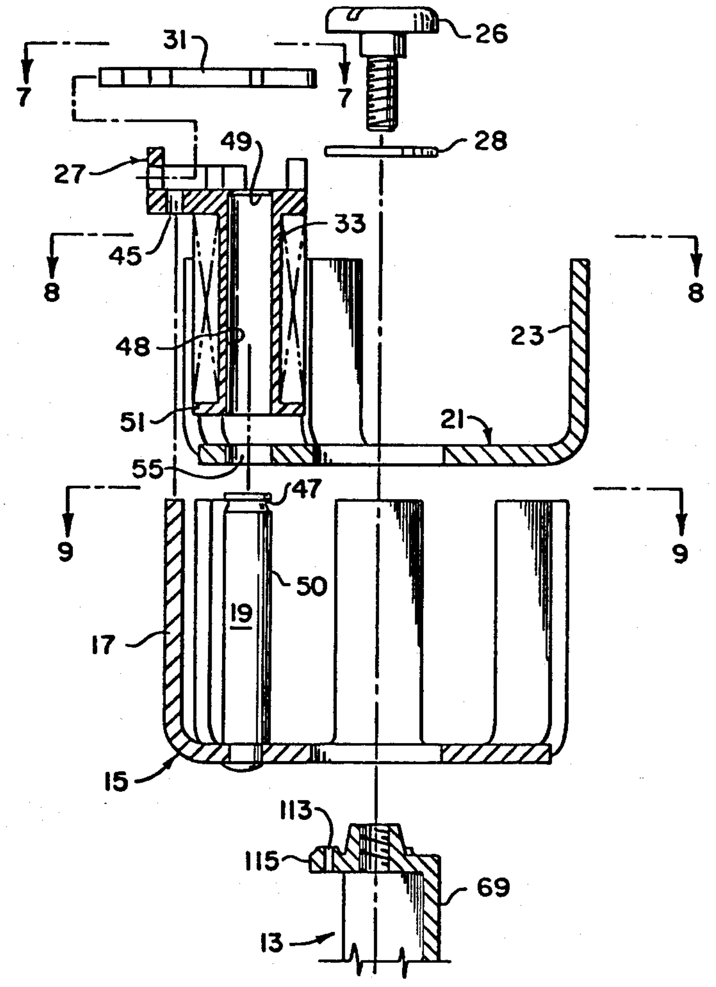
FIG. 4 is a partially exploded view of the top half of FIG. 3 showing the relationship between many of the major parts of the print head including the coil assembly, heat sink member, mounting plate with its integral yoke portions, pole pieces, and the wire guide assembly.
Figure 5:
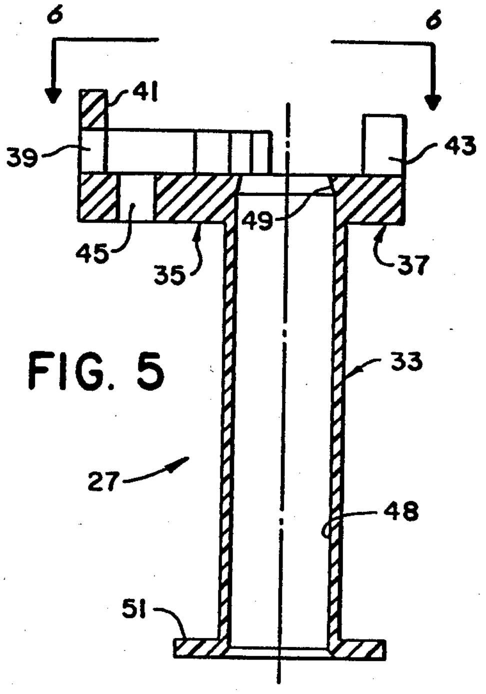
FIG. 5 is a cross-sectional view of the bobbin member of the coil assembly of the present invention.
Figure 6:
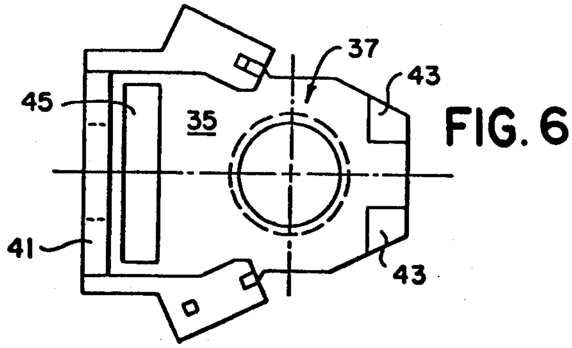
FIG. 6 is a top view of the bobbin member taken along line 6—6 of FIG. 5.
Figure 7:
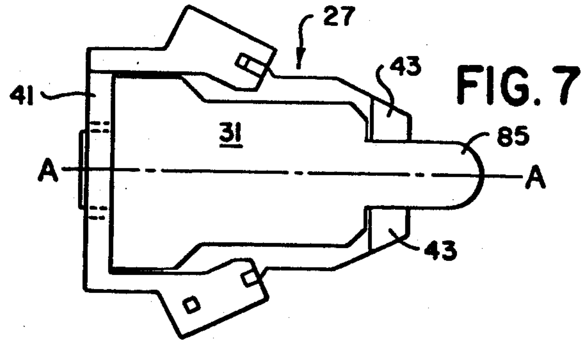
FIG. 7 is a top view of the coil assembly of the present invention taken along line 7—7 of FIG. 4 shown with the clapper member in its operating position on the bobbin member.

Coil assemblies 25 each include a bobbin member 27, coil member 29, and clapper member 31. As best seen in FIGS. 4–7, the bobbin member of the coil assembly has first, second, and third portions. The first portion 33 has an open-ended, hollow shape dimensioned to slideably receive one of the pole pieces 19 therein. The second and third bobbin portions 35 and 37 are attached to and extend outwardly of a common end of the first portion 33 in substantially opposite directions as best seen in FIGS. 5 and 6. The second and third bobbin portions 35 and 37 include means for mounting the clapper member 31 therebetween for movement relative to the bobbin member. The clapper member mounting means includes the rear slot 39 in the upstanding member 41 of the second bobbin portion 35 and the slot between upstanding guide members 43 on the third bobbin portion 37. For clarity, guide members 43 are not shown in the perspective view of FIG. 1. The clapper member 31 is dimensioned to extend outwardly of the central axis A—A at the rear and middle of the clapper member 31 to engage respectively the members 41 and 43 whereby these members serve to restrain the clapper member 31 from movement along the central axis A—A relative to the bobbin member 27 as seen in FIG. 7. Slot 45 in the second bobbin portion 35 serves as an alignment slot to slideably receive the upstanding portion 17 of the yoke member as shown in FIGS. 3 and 4. The members 41 and 43 of the second and third bobbin portion 35 and 37 also serve to restrict the movement of the clapper member 31 whereby the central axis A—A thereof remains in a predetermined plane relative to the bobbin member 27 with this predetermined plane intersecting the alignment slot 45. In operation, the central axis A—A of the clapper member 31 and the central axis of the first bobbin portion 33 remain substantially perpendicular. Also illustrated in FIGS. 3–5 is the recess-detent retaining means 47 and 49 between the inner surface 48 of the first bobbin portion 33 and the outer surface 50 of the pole piece 19 (see FIGS. 4 and 5). In assembling the bobbin member 27 on the pole piece, the pole piece 19 is first slideably received in the first bobbin portion 33 until the recess-detent retaining means 47 and 49 mate as will be explained in more detail herebelow. Also in the assembly procedure, the coil member 29 is mounted about the first bobbin portion 33 and retained in place by the second and third bobbin portions 35 and 37 on one end and the lip member 51 on the other end.

Figure 8:
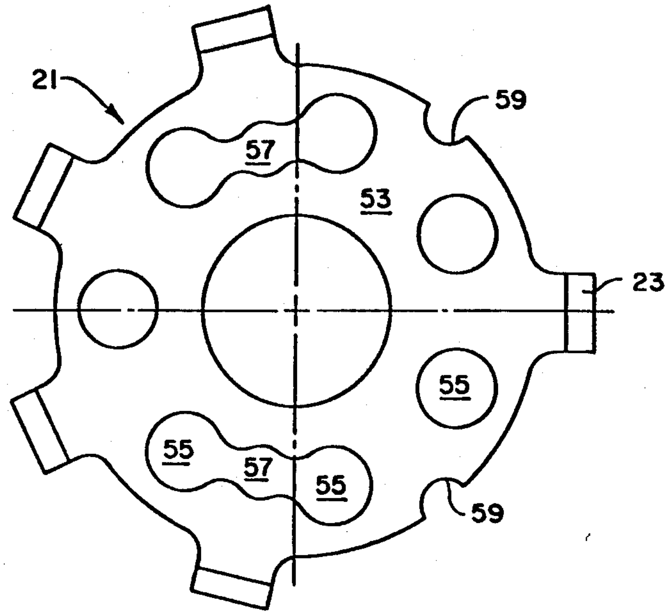
FIG. 8 is a view along line 8—8 of FIG. 4 showing a top view of the heat sink member of the present invention.
Figure 9:
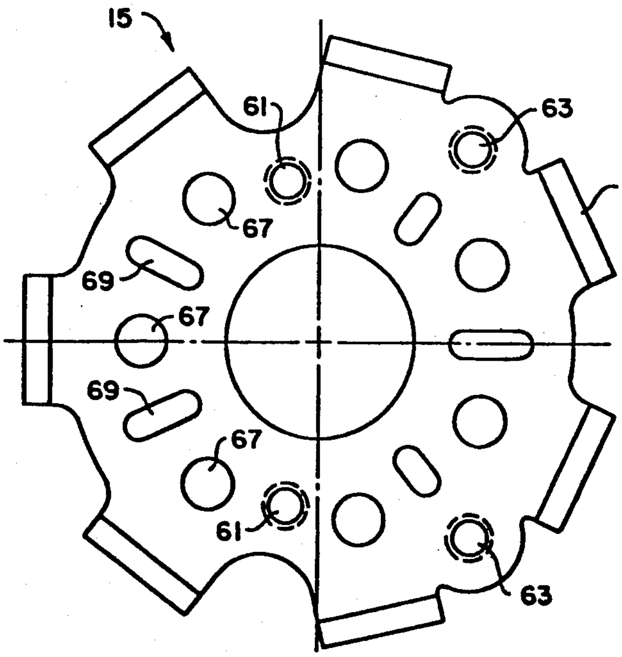
FIG. 9 is a view along line 9—9 of FIG. 4 showing a top view of the mounting plate of the present invention.

The heat sink member 21 and mounting plate 15 are best seen in FIGS. 1–4, 8, and 9. Heat sink member 21 in FIG. 8 has a planar portion 53 with alignment slots 55 therethrough dimensioned to slideably receive the pole pieces 19 as shown in FIGS. 3 and 4. Holes 57 and semi-circular holes 59 in FIG. 8 are slightly larger than and designed to align with holes 61 and 63 in the mounting plate 15 of FIG. 9 to receive the heads of screws holding the mounting plate 15 to the wire guide assembly 13 and holding the rear guide rail, bearing support 65 to the mounting plate 15. Fingers 23 are integral with and extend upwardly from planar portion 53 of the heat sink member 21. Mounting plate 15 has holes 67 in FIG. 9 for receiving the ends of pole pieces 19 and retaining them with the axes of the pole pieces 19 substantially parallel to the axis of the wire guide assembly 13 in FIG. 3. Holes 69 in the mounting plate 15 are present to reduce cross-talk between the coil assemblies 25.

In assembling the print head 1 as best seen in FIGS. 3 and 4, the mounting plate 15 is first slid over the top portion 69 of the plastic, wire guide assembly 13 until it abuts the ledge 71 as shown in FIG. 3. The mounting plate 15 is then fixedly secured to the wire guide assembly 13 by screws placed in holes 61 and extending between the mounting plate 15 and outwardly extending ears (not shown) of the wire guide assembly 13. Screws are then placed through holes 61 to secure the bearing support 65 to the mounting plate 15. The heat sink member 21 is then moved downwardly in FIG. 4 to receive the pole pieces 19 in the alignment slots 55 until the heat sink member 21 abuts the mounting plate 15. Coil assemblies 25 are then moved downwardly in FIG. 4 to slideably receive the pole pieces 19 in the first bobbin portions 33 and the yoke portions 17 in alignment slots 45 of the second bobbin portions 35 until the recessed-detent retaining means 47 and 49 on the inner and outer surfaces 48 and 50 of the poles pieces 19 and first bobbin portions 33 mate. The first bobbin portion 33 is dimensioned so that the mating recess and detent 47 and 49 firmly holds the planar portion 53 of the heat sink member 21 between the lip member 51 and mounting plate 15 as shown in FIG. 3. When assembled, heat sink member 21 helps to transfer heat generated in the area of the pole pieces 19 and coil members 29 outwardly to the finger members 23. Also when assembled, the finger members 23 of the heat sink member 21 and the upstanding yoke portion 17 of the mounting plate 15 are interspersed to provide more surface area for heat loss and to substantially prevent access as by fingers, paper clips, and the like to the interior of the print head 1.

Of particular note in this assembly process is the interaction between the upstanding yoke portions or alignment members 17 and the alignment slots 45 in the second bobbin portions 35. Specifically, the alignment slots 45 are dimensioned to slideably receive the upstanding ends of the yoke portions 17 in a close fitting relationship. By receiving respective pole pieces 19 in the first bobbin portions 33 and the yoke portions 17 in the alignment slots 45 of the second bobbin portions 35, each coil assembly 25 is automatically aligned during assembly with the impact end 85 of the clapper member 31 in FIGS. 2 and 3 against the impact end 87 of one of the print wires 89. Further, as illustrated in FIG. 3, the free standing ends of the yoke portions 17 abut the clapper member 31 when the recess and detent 47 and 49 mate and serve respectively as fulcrums for the clapper members 31.

Figure 11:
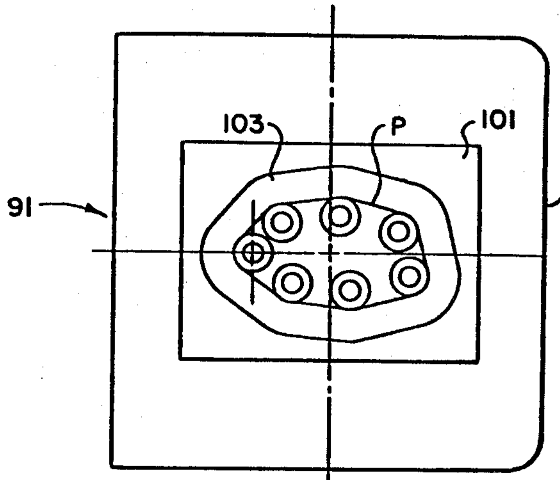
FIG. 11 is a top view of the rear wire guide member taken along line 11—11 of FIG. 10.
Figure 10:
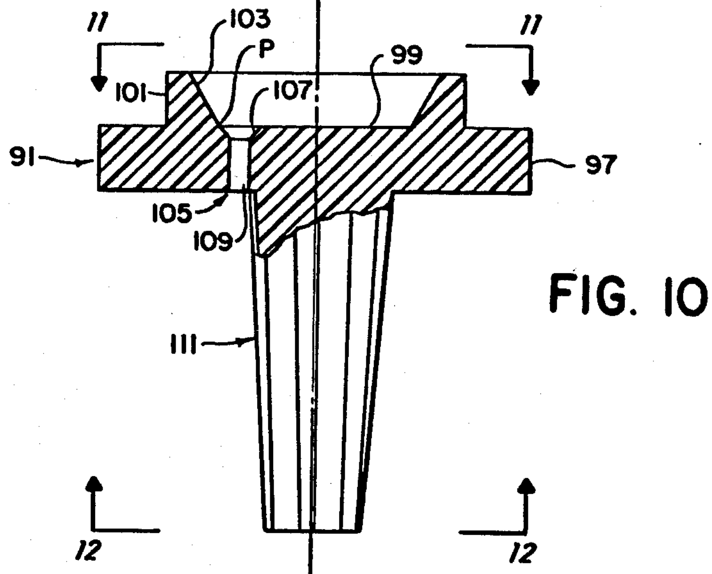
FIG. 10 is a partial cross-sectional view of the rear wire guide member of the present invention.
Figure 12:
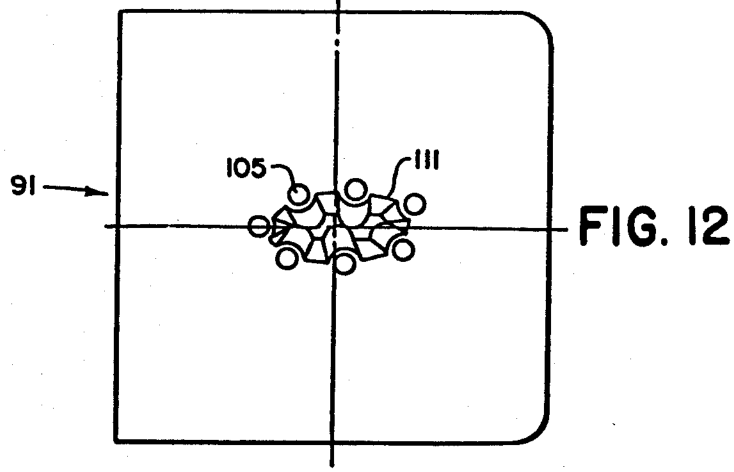
FIG. 12 is a bottom view of the rear wire guide taken along line 12—12 of FIG. 10.
Figure 14:
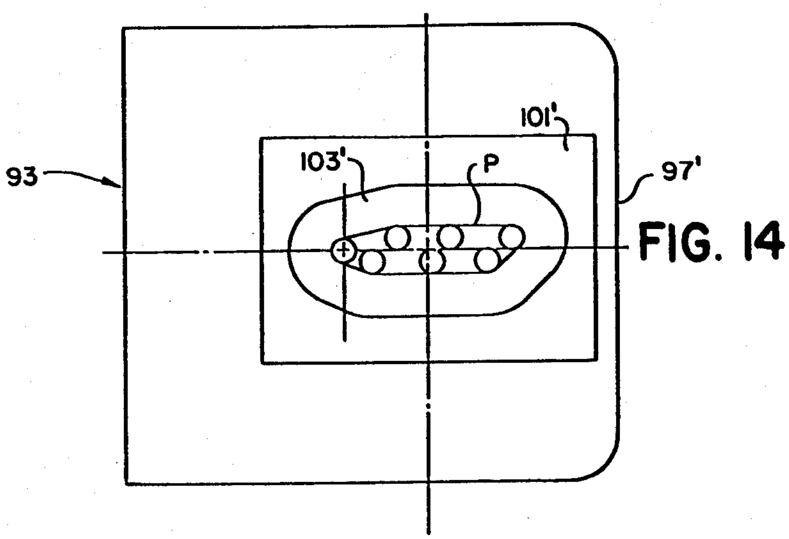
FIG. 14 is a top view of the middle wire guide member taken along line 14—14 of FIG. 13.
Figure 13:
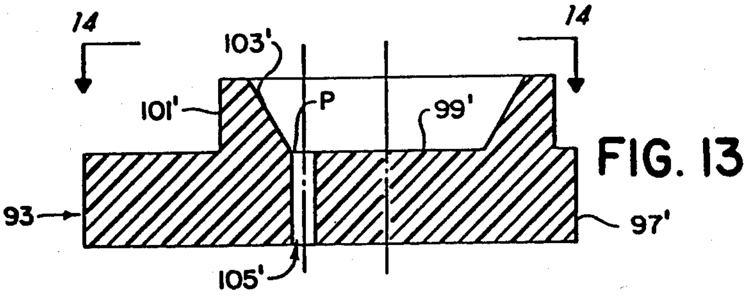
FIG. 13 is a cross-sectional view of the middle wire guide member of the present invention.
Figure 16:
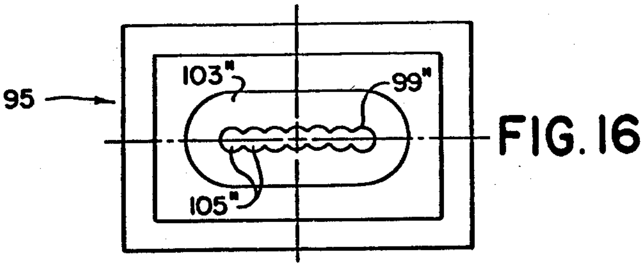
FIG. 16 is a top view of the front wire guide member taken along line 16—16 of FIG. 15.
Figure 15:
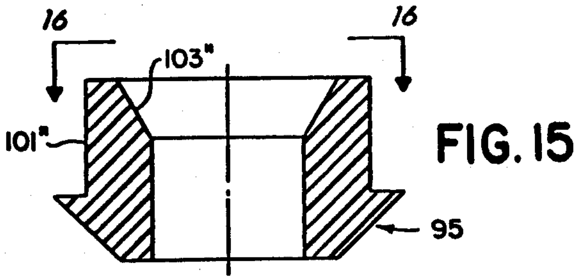
FIG. 15 is a cross-sectional view of the front wire guide member of the present invention.

FIGS. 10–17 illustrate the rear, middle, and front wire guide members 91, 93, and 95 for the print wires 89. Rear and middle wire guide members 91 and 93 in FIGS. 10 and 13 each have a main body 97 and 97' with a planar surface 99 and 99' and a rim portion 101 and 101' attached to and extending upwardly from the planar surface 97 and 97'. The rim portion 101 and 101' has a cam surface 103 and 103' extending upwardly from the planar surface 99 and 99' and outwardly of an axis perpendicular to the planar surface 99 and 99'. The cam surface 103 and 103' intersects the planar surface 99 and 99' at a plurality of points forming a closed path in P as best seen in FIGS. 11 and 14. The rear and middle wire guide members 91 and 93 also have a plurality of holes 105 and 105' through the main body portion 97 and 97'. Each of these holes 105 and 105' extends along an axis substantially parallel to the above-mentioned axis of the cam surface 103 and 103' and intersects the closed path P. In this manner, the print wires 89 can be advanced toward the respective wire guide members 91 and 93 to first contact the cam surface 103 and 103' of the rim portion 101 and 101' and then slideably moved therealong into one of the holes 105 and 105'. In the rear wire guide member 91 as shown in FIG. 10, the hole 105 is defined by first and second surfaces 107 and 109. The first surface 107 extends downwardly from the planar surface 103 and inwardly of the axis of the hole 105 to form a truncated cone shape. The second surface 109 is substantially cylindrical and extends downwardly from the first surface 107 about the axis of the hole 105. The front wire guide member 95 in FIGS. 15 and 16 also has a rim portion 101" with a cam surface 103" and a planar surface 99" which is much smaller than corresponding planar surfaces 99 and 99' because the holes 105" are aligned and interconnected as can be seen in FIG. 16.

Figure 17:
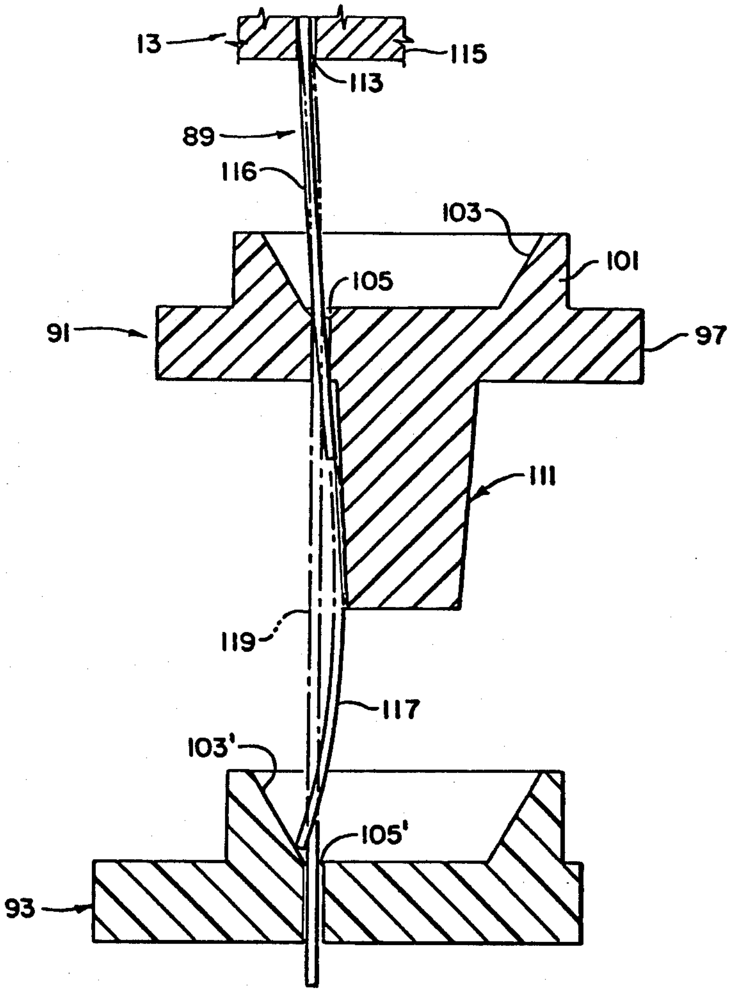
FIG. 17 is a cross-sectional view of the top rear, and middle wire guide members 115, 91, and 93 of the wire guide assembly illustrating the manner in which the grooved assembly aid attached to the rear wire guide member assists in the proper assembly of the print wires between the rear and middle wire guide members 91 and 93.

The grooved member 111 depending from the rear wire guide member 91 in FIG. 10 is an assembly aid for assisting the sequential insertion of the print wires 89 into the holes 105' of the middle wire guide member 93 as illustrated in FIG. 17. Referring to FIG. 17, the print wire 89 is first inserted through one of the holes 113 in the top wire guide member 115 shown in FIGS. 3, 4, and 17–19. The print wire 89 is then advanced along a substantially straight path (shown in solid lines in FIG. 17) toward and through the hole 105 in the rear wire guide 91 until the leading end of the print wire 89 contacts the grooved assembly aid 111 in the bottom of a predetermined groove thereof. By continuing to advance the print wire 89, the assembly aid 111 serves to apply a force to the print wire 89 in a direction substantially perpendicular to the substantially straight path 116 mentioned above whereby the print wire 89 assumes a first bowed shape defining a path 117. Further advancing of the lead end of the print wire 89 along the first bowed shaped path 117 causes the lead end to contact the cam surface 103' of the middle wire guide member 93 where it is guided into the hole 105'. The cam surface 103' serves a second assembly aid and when the print wire 89 is passed through the hole 105' in the middle wire guide member 93, the print wire 89 assumes a second bowed shape 119 which has less bow than the first bowed shape 117. In this manner, contact with the assembly aid 111 is eliminated and the print wire 89 only bears against the top, rear, and middle wire guide members 115, 91, and 93. This assembly technique using the assembly aids 111 and 103' reduces the assembly time necessary to insert the print wires 89 and eliminates the need for an assembler to physically grip and guide the print wires 89 through the holes 105' in the middle wire guide member 93.

Figure 18:
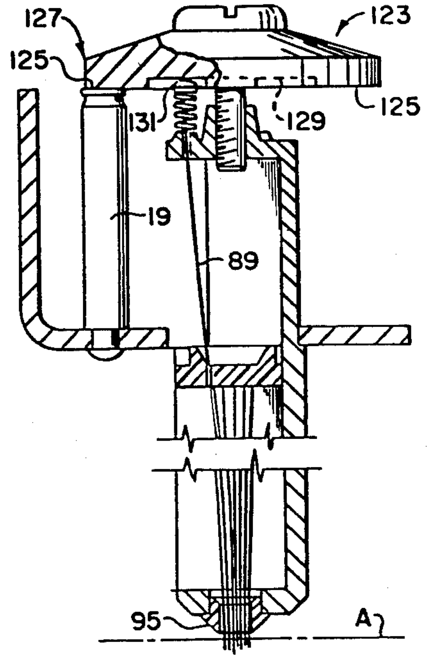
FIG. 18 is a partial, cross-sectional view of an assembly aid 111 and procedure whereby all of the print wires can be easily and quickly ground to the proper length.

FIG. 18 also illustrates an assembly technique for grinding all of the print ends of the print wires 89 so they lie in a common plane A in the impact area. In this assembly method, the cap 123 is screwed downwardly until the surface 125 of the rim portion 127 abuts the tops of the pole pieces 19. At this point, the inner, planar surface 129 of the cap 123 contacts all of the impact ends 131 of the print wires 89 and advances the print ends of the print wires 89 out of the front wire guide member 95 as illustrated in FIG. 18. The print ends are then ground off in a common plane which is perpendicular to the axis of the wire guide assembly 13 and parallel to the planar surface 129 of the cap 123. The distance between the rim surface 125 and the inner surface 129 of the cap 123 is exactly the thickness of the impact end 85 of the clapper member 31. Consequently, the cap 123 can be removed and replaced with restraining screw 26 and backstop 28 in FIGS. 3 and 19 whereby the restraining screw 26 is advanced until the surface 133 of the backstop 29 is exactly in the same place that inner surface 129 was in at the time of the grinding. In practice, this is accomplished by advancing the restraining screw 26 until it abuts surface 135 of the wire guide assembly 3 in FIG. 19 and then backing the restraining screw 26 off a predetermined number of turns.

Figure 19:
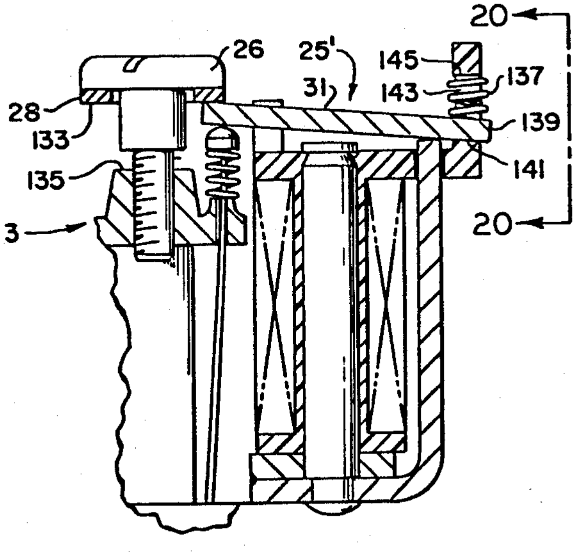
FIG. 19 is a cross-sectional view of a modified coil assembly design in which a return spring arrangement is mounted between the second bobbin member portion and the rear end of the clapper member.
Figure 20:
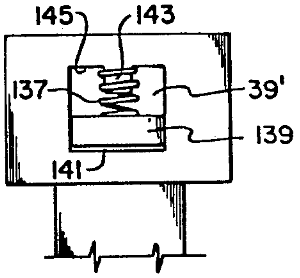
FIG. 20 is a view along line 20—20 of FIG. 19 showing a side view of the return spring arrangement for the clapper member.

FIGS. 19 and 20 illustrate views of a modified coil assembly 25' of the present invention. In the modified coil assembly 25', a return spring 137 is provided for biasing the rear end portion 139 of the clapper member 31 toward the bottom side 141 of the slot 39'. As seen in FIGS. 19 and 20, a post member 143 is attached to and extends downwardly from the top side 145 of the slot 39'. The free end of the post member 143 extends toward the bottom side 141 of the slot 39' for about half the distance between the top and bottom sides 145 and 141. The coil spring 137 is positioned about the post member 143 between the top side 145 and the rear portion 139 of the clapper member 31 as illustrated in FIGS. 19 and 20. The cord spring 137 serves to bias the rear end portion 139 of the clapper member 31 toward the bottom side 141 of the slot 39 and away from the top side 145 and post member 143.

Further designs of the present invention for simplifying and reducing the time needed for assembly and disassembly include the clamp means 147 for removably mounting the print head 1 to the main guide bearing 149 in FIGS. 1 and 3 and the snap arrangement 151 for mounting the print head 1 to the bearing 153 which rides on the rear guide rail 5. In assembly, the print head 1 is clamped to the main guide bearing 149 by placing the main guide bearing 149 between clamp portion 155 on the print head 1 and clamp portion 157 on the lower end of the support member 65. Screw 159 and the screws holding the support member 65 to the mounting plate 15 as discussed above are then tightened so that the print head 1 is firmly clamped to the main guide bearing 149. The head shaft 3 could already be positioned in the main guide bearing 149 prior to this clamping or it can be slid into the main guide bearing 149 after the clamping procedure. The snap arrangement 151 by which the print head 1 is mounted to the bearing 153 includes the substantially U-shaped portion or member 161 on the top end of the support member 65 which has an inner surface substantially corresponding to the shape of the outer surface of the guide bearing 153. The guide bearing 153 has a resilient detent member 165 forming part of the outer surface. The inner surface of the U-shaped portion 161 has a mating recess portion 167 whereby the bearing 153 can be snapped into place and held against the U-shaped portion 161 of the support member 65 with the inner and outer surfaces thereof abutting each other. In one assembly procedure, the bearing 153 is snapped into place against the U-shaped portion 161 of the support member 65 and then the rear guide rail 5 inserted in the bearing 163 and in another procedure, the bearing 153 can be mounted on the rear guide rail 5 and then the U-shaped portion 161 snapped thereon.

While several embodiments of the present invention have been described in detail herein, various changes and modifications can be made without departing from the scope of the invention.

We claim:

1. A wire guide member for a dot matrix head, said wire guide member comprising:

a main body portion having a planar surface and a rim portion attached to and extending upwardly from said planar surface, said rim portion having a cam surface extending upwardly from said planar surface and outwardly of a first axis perpendicular to said planar surface, said cam surface intersecting said planar surface at a plurality of points forming a closed path, said wire guide member further including a plurality of holes through said main body portion, each of said holes extending along an axis substantially parallel to said first axis and being defined by at least a first surface, said first surface extending dowwardly from said planar surface and inwardly of the axis of the respective hole to form a truncated conical shape, said first surface being positioned adjaced said cam surface and intersecting said closed path whereby print wires being advanced toward said wire guide member can first contact said cam surface of said rim portion and then move slideably therealong into one of said holes.

2. The wire guide member of claim 1 whereby each of said holes is further defined by a second surface, said second surface being substantially cylindrical and extending downwardly from said first surface about said hole axis.

3. A method for sequentially inserting an elongated, flexible print wire with first and second ends through three holes in three respective wire guide members spaced from each other in a wire guide assembly, said method comprising the steps of:

(a) inserting one end of said print wire into a first hole in the first of said three wire guide members, (b) advancing said one end of said print wire along a first, substantially straight path toward and through a second hole in the second of said three wire guide members, (c) continuing to advance said one end of said print wire along said first path toward the third of said three wire guide members, (d) contacting said print wire with a first assembly aid fixedly mounted and extending between said second and third wire guide members to apply a force to said print wire in a first direction substantially perpendicular to said first, substantially straight path whereby said print wire assumes a first bowed shape defining a path, (e) continuing to advance said one end of said print wire along said first bowed shaped path toward a third hole in the third wire guide member, and (f) contacting said print wire with a second assembly aid fixedly mounted to the third wire guide member to apply a force thereto in a direction substantially opposite to said first direction to guide said one end of said print wire into and through said third hole with said print wire assuming a second bowed shape of less bow than said first bowed shape whereby said contacting of step (d) is eliminated and said print wire only bears against said first, second, and third wire guide members.

* * * * *